United States Patent [19]

Sanchez

[11] Patent Number: 4,852,476
[45] Date of Patent: Aug. 1, 1989

[54] BARBECUE APPARATUS

[76] Inventor: Raymond Sanchez, 8235 SW. 46 St., Miami, Fla. 33155

[21] Appl. No.: 194,564

[22] Filed: May 16, 1988

[51] Int. Cl.$^4$ ................................................ A23L 3/00
[52] U.S. Cl. .................................... 99/443 R; 99/393; 99/400; 99/421 R; 99/421 HV; 126/25 A
[58] Field of Search ................. 99/385, 393, 402, 419, 99/421 R, 400, 421 H, 421 HV, 443 R, 446, 339; 126/9 B, 25 A, 25 AA, 41 E, 41 A, 338; 220/8; 318/282, 280, 281, 286, 293

[56] References Cited

U.S. PATENT DOCUMENTS

| | | | |
|---|---|---|---|
| 2,047,565 | 7/1936 | Kip | 99/421 HH |
| 2,446,669 | 8/1948 | Satchik | 220/8 X |
| 3,191,519 | 6/1965 | Kidder | 99/421 HV |
| 3,455,232 | 7/1969 | Oliver, Jr. | |
| 3,943,837 | 3/1976 | Trkla | |
| 4,043,260 | 8/1977 | La Pour | 99/421 HV X |
| 4,181,074 | 1/1980 | Hieb | 99/446 X |
| 4,462,306 | 7/1984 | Eisendrath | 99/421 HV X |
| 4,599,546 | 7/1986 | Hemura | 318/286 X |

Primary Examiner—Harvey C. Hornsby
Assistant Examiner—K. O'Leney
Attorney, Agent, or Firm—J. Sanchelima

[57] ABSTRACT

A barbecue grill with a housing member that defines a rectangular compartment where a food supporting assembly and a heat source assembly are housed in a variable spaced apart relationship. The food supporting assembly includes typically a shaft through which food items are inserted and grills where they are broiled. The shaft is driven through an electric motor. The heat source assembly is suspended from a pair of steel wire elements that are wound on a bar and directed through pulleys in order to uniformly lift or power the heat source assembly through a reversible electric motor. Normally closed switches are connected in series with the power connections for each direction of rotation of the reversible motor and physically located where they are actuated by the heat source assembly to interrupt it, travel.

7 Claims, 4 Drawing Sheets

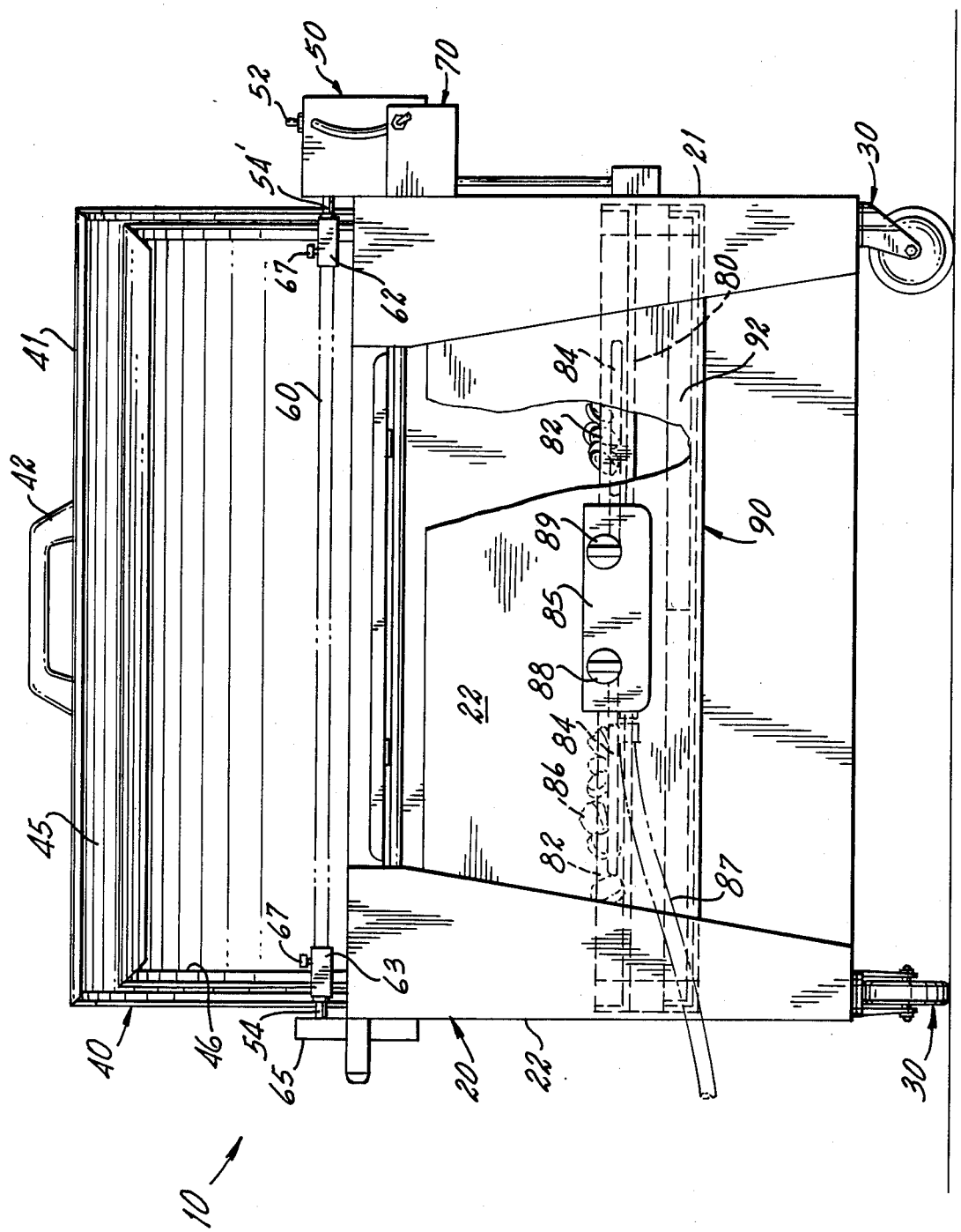

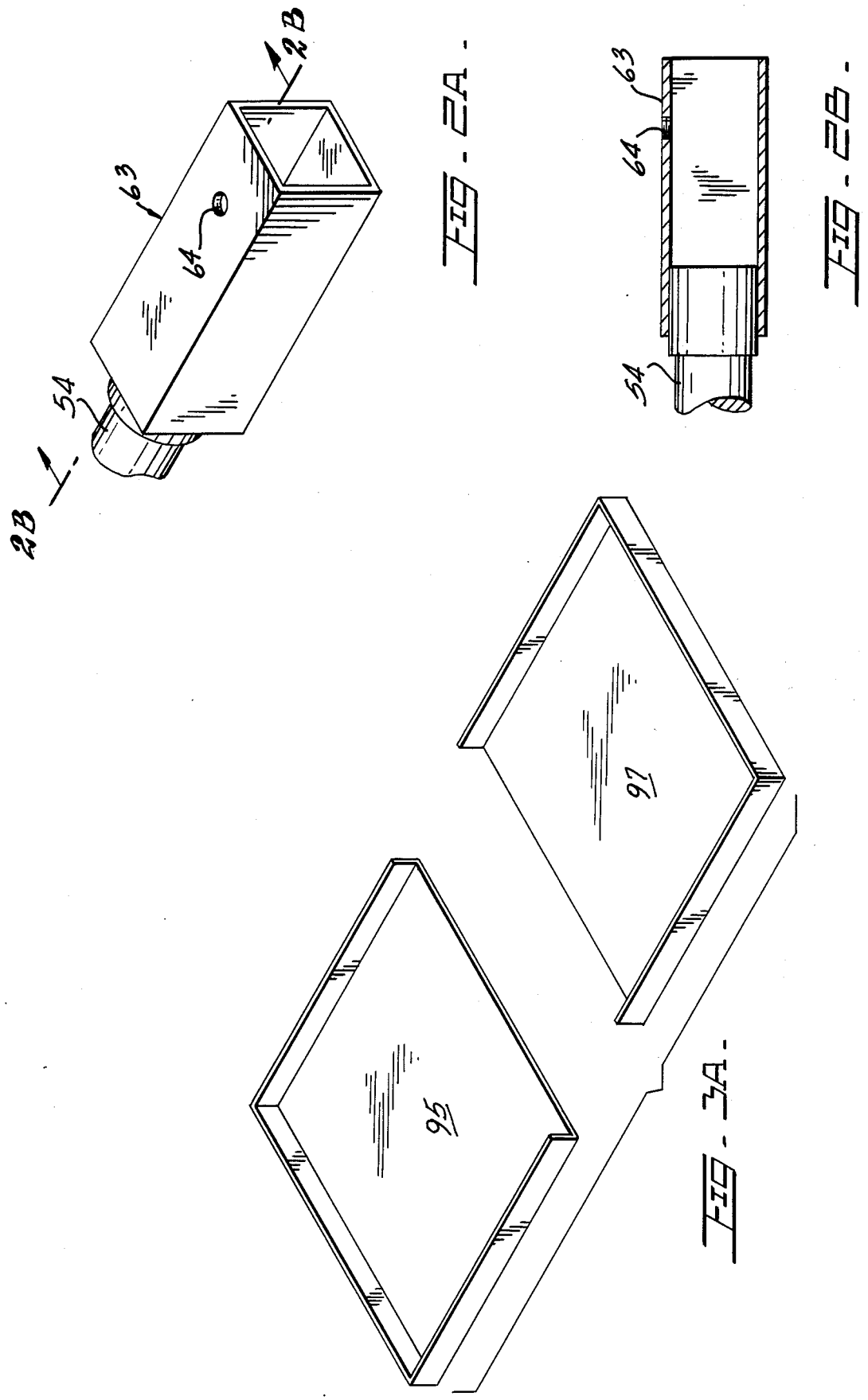

BARBECUE APPARATUS

II. BACKGROUND OF THE INVENTION

1. Field of the Invention.

The present invention relates to barbecue apparatus, and more particularly, to such apparatus that provide mechanism for varying the distance between the heat source and the food being cooked.

2. Description of the Related Art.

There have been several designs for barbecues and grills in the past that provide for a number of features intended to uptimize and facilitate the cooking of foodstuffs. None of these devices however provide for ready means for varying the heat source separation, and consequently the temperature, from the food being cooked.

Applicant believes that the closest reference corresponds to U.S. Pat. No. 3,455,232 issued to Oliver. However, it differs from the present invention because it shows a vertically adjusting tray holding the foodstuff which could vary in weight. Also, it requires the use of a voluminous track mechanism.

In U.S. Pat. No. 3,943,837 issued to Trkla in 1976, a mechanism is disclosed for lifting a heat source assembly. However, it requires the user's coordinated pulling of the two claims in order to achieve a uniform lifting or lowering of the assembly.

Other patents describing the closest subject matter provide for a number of more or less complicated features that fail to solve the problem in an efficient and economical way. None of these patents suggest the novel features of the present invention.

III. SUMMARY OF THE INVENTION

It is one of the main objects of the present invention to provide a barbecue apparatus that includes a mechanism for varying the distance between the heat source and the food being cooked.

It is another object of this present invention to provide such an apparatus that includes an electrically powered motor to achieve the above referenced variation of the distance of separation.

It is still another object of this present invention to provide such an apparatus that includes a volumetric efficient mechanism for lifting and lowering the heat source and that at the same time is reliable.

It is yet another object of this present invention to provide such an apparatus that is whether proof.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an elevational front view of this invention, with a partially broken front cover to permit the viewing of internal components.

FIG. 2 shows an elevational end view of the present invention.

FIG. 2A is a detailed view of the coupling connector, in perspective.

FIG. 2B is a cross-sectional view of the connector shown in FIG. 2A.

FIG. 3A shows a view of the telescopically cooperating tray members.

V. DETAILED DESCRIPTION OF THE PREFERRED EMBODIMENT

Figure 3:
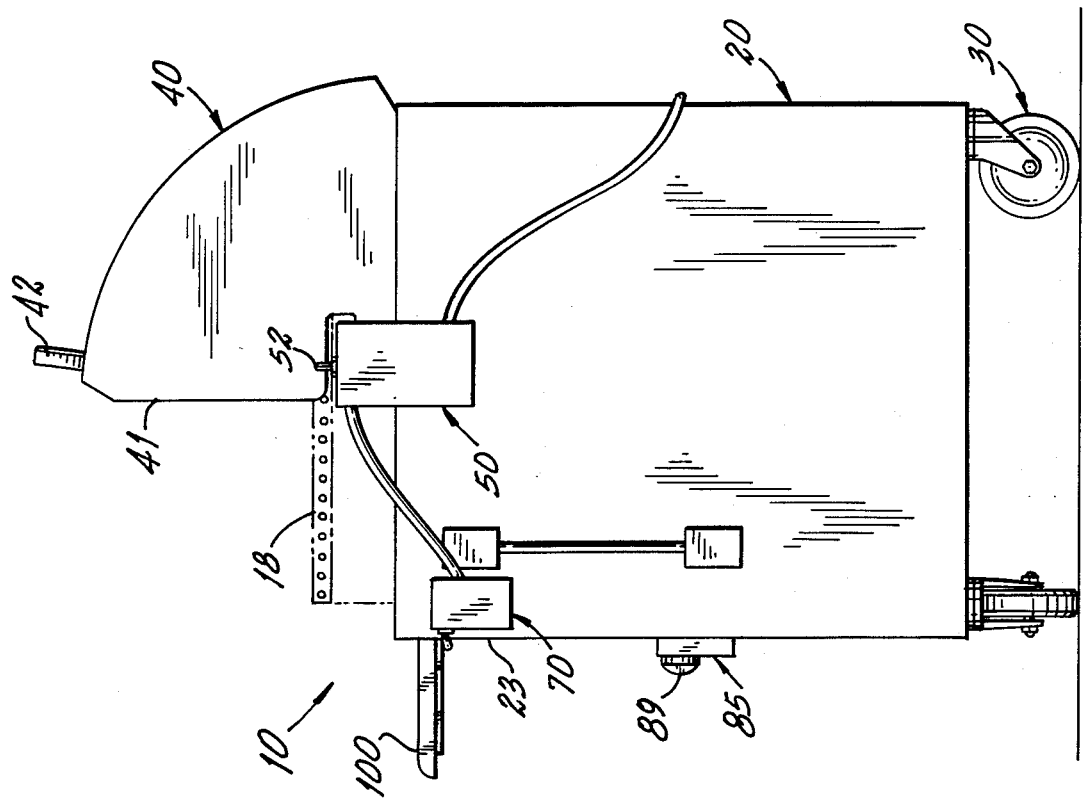
FIG. 3 illustrates a view, in perspective, of the mechanism used to lift and lower the heat source assembly.
Figure 4:
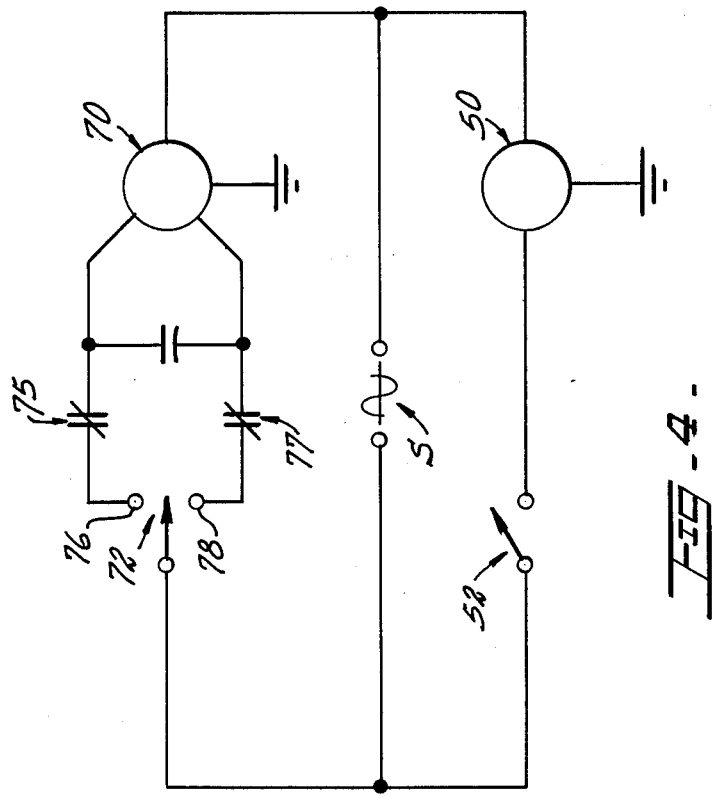
FIG. 4 is a schematic diagram of the motor circuits utilized to implement the present invention.
Figure 3:
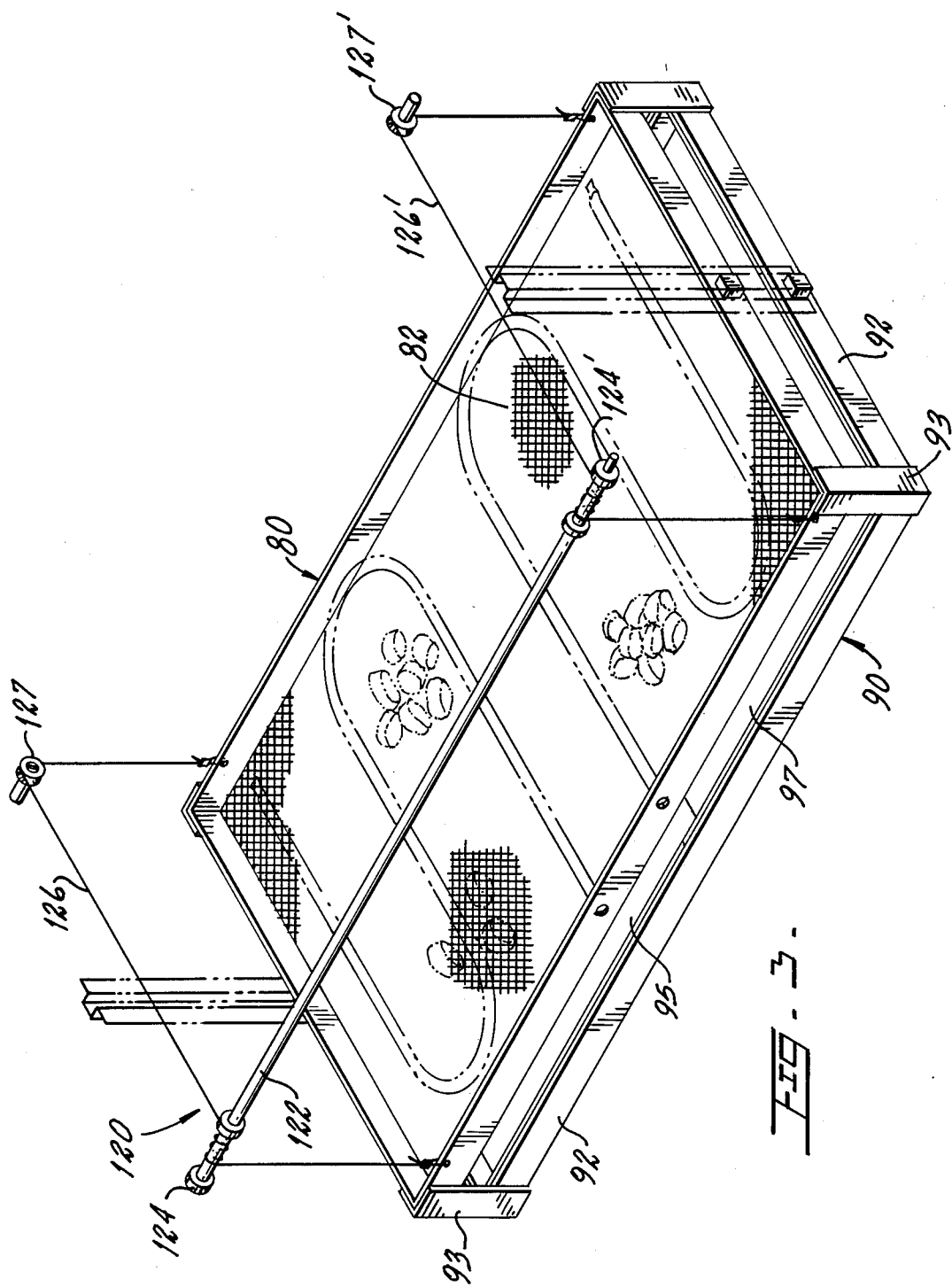

Referring now to FIGS. 1 and 2, where the present invention is generally referred to with numeral 10, it can be observed that it basically includes housing frame 20 with substantially rectangular projections and defining an inner compartment 122. Frame 20 rests on wheel assemblies 30 that are pivotally mounted to the bottom corners. A cover assembly 40 includes outer cover member 41 hingedly mounted to the upper end of walls 21 and 22 of frame 20 and it includes handle 42. Inner cover member 46 is rigidly mounted to the rear upper edge of frame 20 and in cooperation with outer cover member 41 closes the upper end of space 122 leaving only a longitudinal separation 45 between them, that allows the smoke to escape rearwardly. Grill assembly 18 removably mounts substantially on the upper end of compartment 122.

As seen in FIG. 3, electrical motor assembly 50 includes a switch assembly 52 that interrupts the electrical power source for providing the rotating force applied to shaft member 60. Member 60 is removably mounted to shaft 54 of electric motor assembly 50 through coupling connector member 62, as shown in FIGS. 1 and 2. Preferably, electric motor assembly 50 is powered by the conventional AC 110 volts supply network S but it can also be battery operated where needed.

Shaft member 60 has preferably a non-circular cross-section and it is inserted through the food items being grilled. Bearing assembly 65 provides rotable support for the other end of bar member 60 through coupling connector member 63. Coupling connector members 62 and 63 provide the means for quickly connecting and disconnecting shaft member 60, as best seen in FIGS. 2A and 2B. To secure connector 62 in place with respect to shaft member 60, a threaded opening 65 is provided that cooperates with butterfly set screw 67. Shaft member 60 needs to be long enough to be received within connectors 62 and 63, and set in place by set screws 67. Since shaft member 60 has preferably a non-circular cross-section, members 62 and 63 have a cooperating receiving cavity that prevents slippage.

A second electric motor assembly 70 is preferably mounted on the same end wall as assembly 50 and provides the necessary force to lift and lower heat source assembly 80 so that the temperature of the foodstuff being cooked is varied accordingly. It includes double throw single pole momentary switch assembly 72 for interrupting (or applying) power to motor assembly 70 in series with two travel limiting switches 75 and 77 connected to each one of the two contacts 76 and 78. Switches 75 and 77 are normally closed and they are opened by the action of heat source assembly 80 so that the travel of the latter can be limited. Switch 75 is obviously positioned in the upper end of the travel of assembly 80 if it is connected in series with the contact of motor 70 that causes assembly 80 to be lifted. Switch 77, similarly, is connected at the lower end of the travel of assembly 80 so that it opens by the action of assembly 80. Electric motor assembly 70 includes a 3-wire reversible motor, of the permanent split capacitor type and preferably with a start torque of at least 56 inches-pounds.

Heat source assembly 80 includes supporting tray assembly 82 that supports burners 84 or charcoal 86, depending on what fuel is preferred by the user. In FIG. 1, the left half of tray member 82 is shown with charcoal 86 and the right half is represented with gas burner element 84. Typically the unit will have two independent burner elements 84, one on the left and one on the right. This way, the flanges on each burner can be controlled independently through control knobs 88 and 89. To operate, a user may remove one or both of the two burners and use charcoal, if desired. Valves assembly 85 is connected through conduit 87 to a gas supply (not shown). Collecting tray assembly 90 is removably mounted inside space 22 and below heat source assembly 80. Collecting tray assembly 90 is designed to collect ashes, dripping fat and other debris. Preferably, tray assembly 90 includes two tray members 95 and 97 slidably and telescopically mounted over each other so that they can be easily removed and installed on peripheral L-beams 92, as best seen in FIGS. 3 and 3A.

As can be seen in FIG. 2, cutting board member 100 is rigidly mounted to the upper end of the front wall 23 of frame 20 and it is intended to provide sufficient space for cutting and other activities normally associated with cooking.

As seen in FIG. 3, framing L-beam members 92 form a frame that support telescopic members 95 and 97. Corner L-beam members 93 keep framing members 92 and collecting tray assembly 90 in a spaced apart relationship with respect to heat source assembly 80. The combination of heat source assembly 80 and collecting tray assembly 90 then is moved up and down through lifting mechanism 120. Lifting mechanism 120 includes a take up bar 122 supported at its ends preferably by ball bearing assemblies 124 and 124'. Bar 122 is driven by motor 70 and it winds steel wire members 126 and 126' on sections substantially towards the ends of bar 122 so that one end of wire members 126 and 126' is rigidly attached to the front of heat source assembly 80 or any other part rigidly mounted thereto and the other ends of wire members 126 and 126' extending towards the back and then diverted downwardly by pulley members 127 and 127' to attach to a corresponding point in the rear of heat source assembly 80. When bar member 122 turns in one direction it winds the steel taking up the same length from both ends and, conversely, when it unwinds it is done in a similar fashion. This simple and volumetric efficient mechanism has been used and tested many times without experiencing fatigue on the steel wires that would impair its performance.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A barbecue grill for cooking food items, comprising:
    A. a housing member defining a compartment;
    B. a heat source assembly mounted within said compartment;
    C. means for supporting said food items within said compartment;
    D. means for lifting and lowering said heat source assembly including a bar member that is positioned above said heat source assembly and further includes at least two wire means wound around said bar substantially at its ends and said wire means having two ends, one of said ends of each of said wire means being attached to said heat source assembly at one point and the other end being attached to another point in said heat source assembly and including at least one pulley means for each one of said wire means so arranged and constructed that said heat source assembly is lifted and lowered uniformly by rotating said bar;
    E. means for covering said compartment at said top end; and
    F. first electric motor means for driving said bar and said first electric motor means being of the reversible type and including single pole double throw switch means for activating it in either direction, and further comprising normally closed switch means in series with the connections from each of the two positions of said double throw switch means and said normally closed switch means positioned in said housing member so that they are interrupted by movements of said heat source assembly thereby limiting its travel.

2. The barbecue grill set forth in claim 1 wherein said means for supporting said food items further include a shaft member rotably positioned inside said compartment above said heat source means and rigidly mounted to said housing member.

3. The barbecue grill set forth in claim 2, further including:
    G. second electric motor means for driving said shaft member.

4. The barbecue grill set forth in claim 3, further including:
    H. a tray assembly rigidly mounted below said heat source assembly at a spaced apart relationship so that it collects debris from the heat source assembly above it.

5. The barbecue grill set forth in claim 4 wherein said tray assembly includes two telescopically mounted halves of said tray assembly so that said halves can be readily slid over each other to allow its removal and installation.

6. The barbecue grill set forth in claim 5 wherein said tray assembly includes a rectangular frame including four interconnected L-shape members that cooperatively receive said halves.

7. The barbecue grill set forth in claim 6 wherein said wire means are made out of steel.

* * * * *